INVENTORS:
HERMAN J. SCHROEDER
RALPH E. WHITE

INVENTORS:
HERMAN J. SCHROEDER
RALPH E. WHITE

Dec. 31, 1968  H. J. SCHROEDER ET AL  3,419,882
AUTOMATIC RECORDING OF MOTOR FUEL SALES FROM DISPENSING
PUMPS WITH INFORMATION FROM INSERTED CREDIT CARD
Filed April 5, 1966  Sheet 3 of 3

INVENTORS:
HERMAN J. SCHROEDER
RALPH E. WHITE

United States Patent Office 3,419,882
Patented Dec. 31, 1968

3,419,882
AUTOMATIC RECORDING OF MOTOR FUEL SALES FROM DISPENSING PUMPS WITH INFORMATION FROM INSERTED CREDIT CARD
Herman J. Schroeder, 1710 E. Mendocino St., and Ralph E. White, 1699 E. Mendocino St., both of Altadena, Calif. 91001
Filed Apr. 5, 1966, Ser. No. 540,337
6 Claims. (Cl. 346—43)

ABSTRACT OF THE DISCLOSURE

A method and apparatus for automatically recording and billing the sales of motor fuels, for example, from fuel dispensing pumps. The apparatus includes a printing plate member upon which billing forms may be placed so that the billing forms may be moved into contact with printing rollers for thereby recording various detailed information relating to the sale of motor fuels and the like.

This invention relates to a method of recording and billing automatically the sales of motor fuels from dispensing pumps. More particularly it relates to a method of recording and billing sales to credit card owners. The purpose of the invention is to make it unnecessary for the operator of a gasoline dispensing pump to manually write out charge tickets for each sale and record information from the credit card holder. By means of this invention it is only necessary for the pump operator to insert the purchaser's credit card in a slot in the pump along with the blank form for billing in duplicate or triplicate and by moving a lever, record all the information on that sale on the billing form. Simultaneously with the printing of the desired information on the billing form, a complete record is also prepared for auditing purposes.

Figure 1:
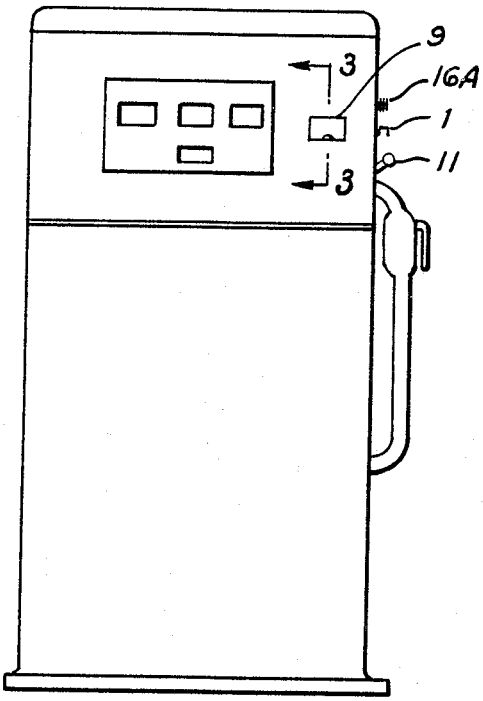
Figure 2:
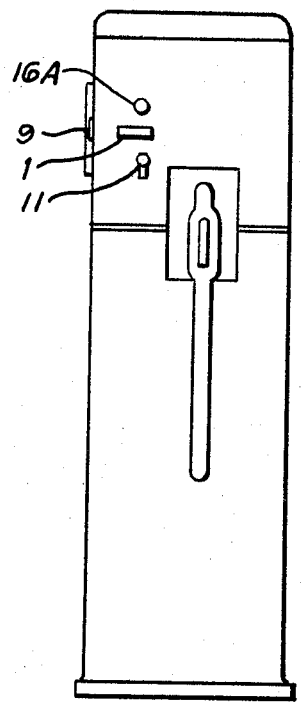
Figure 3:
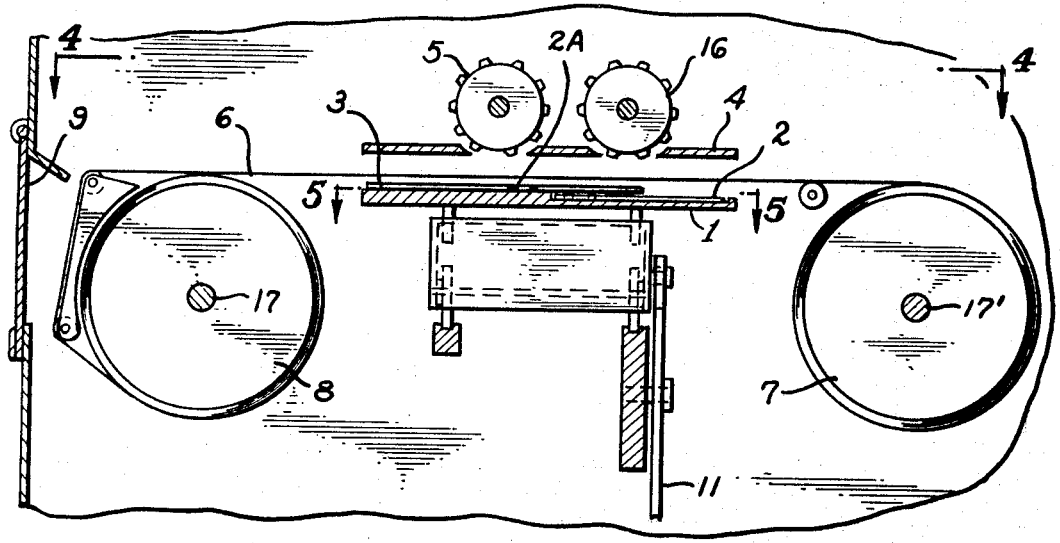
Figure 4:
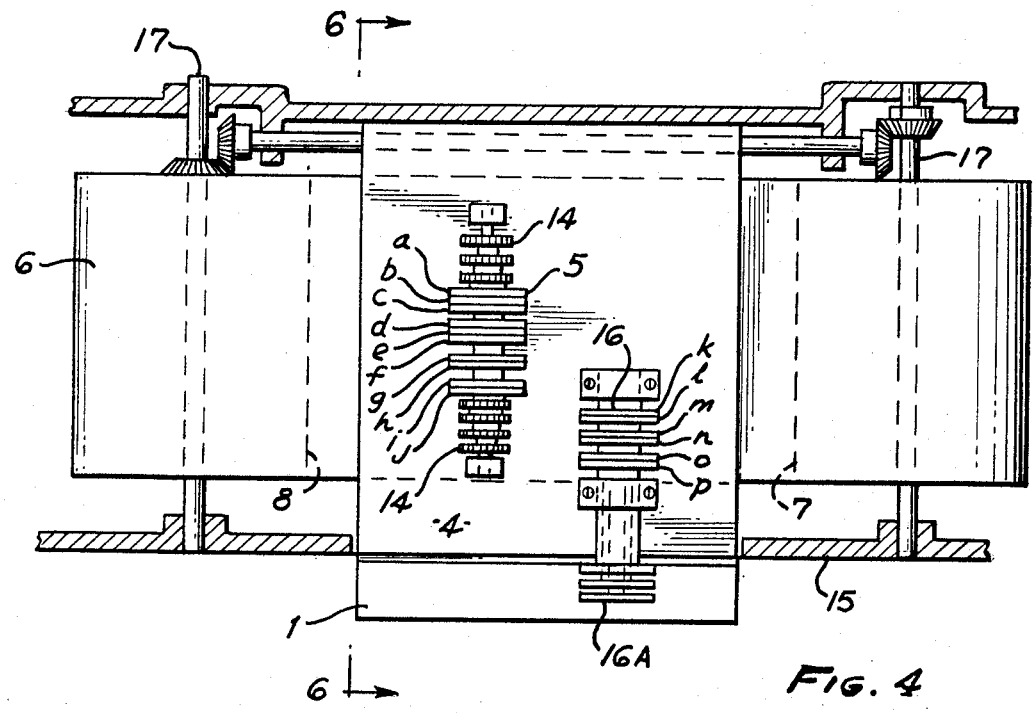
Figure 5:
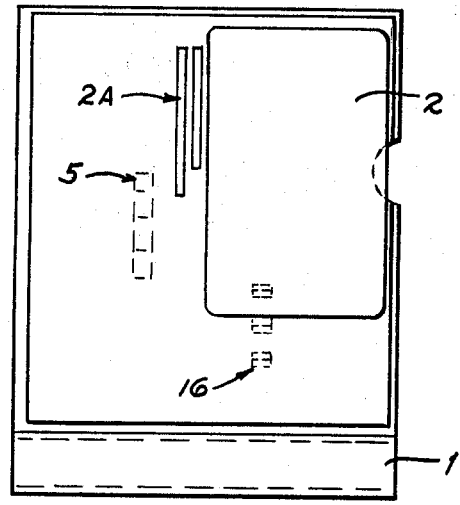
Figure 6:
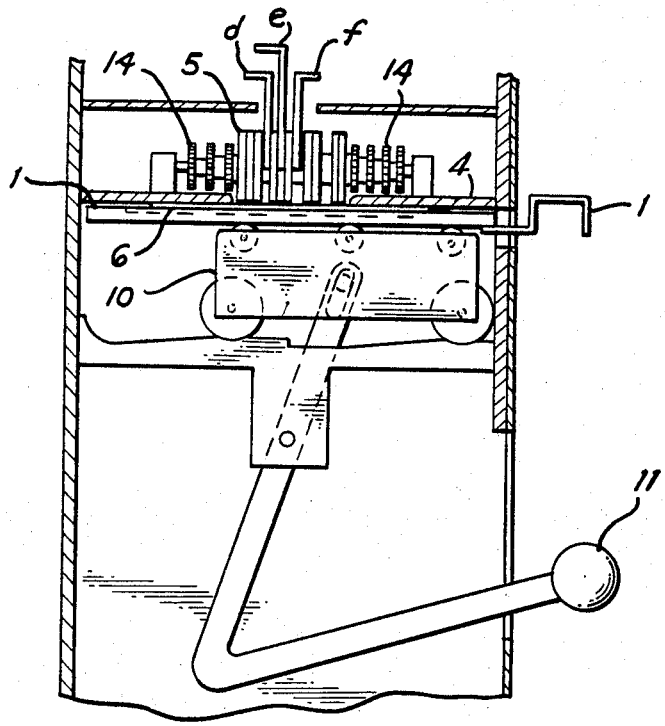
Figure 7:
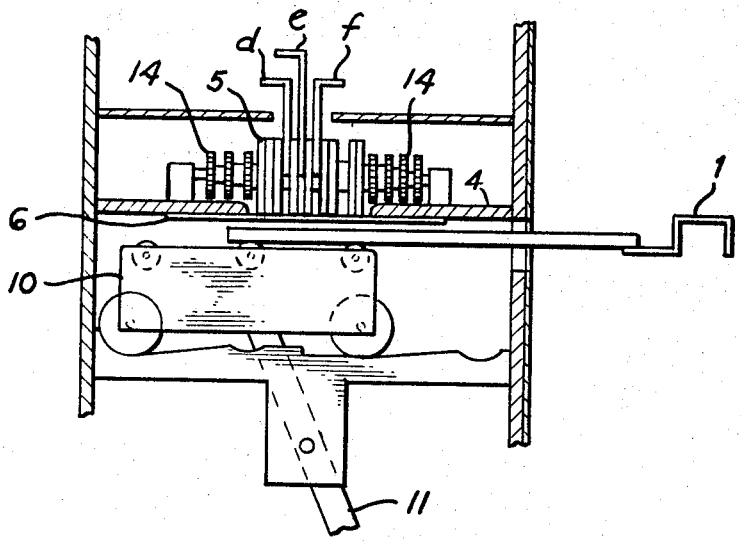

The invention will be thoroughly understood by reference to the accompanying drawing. FIGURE 1 of the drawing shows a front view of a gasoline dispensing pump. FIGURE 2 is a side view of the pump showing a slot for introducing the purchaser's credit card. FIGURE 3 is a sectional view of the working part of the apparatus. FIGURE 4 is a cross-section of FIGURE 3 showing a top view of the printing wheels. FIGURE 5 is a sectional view taken through FIGURE 3 showing the credit card holder plate against which the bill is printing. FIGURE 6 is a sectional view taken through FIGURE 4. FIGURE 7 is a sectional view showing the printing mechanism.

It has heretofore been necessary when selling gasoline or other motor fuel to customers holding credit cards, for the operator to record on the sales slip invoice or bill, the number of gallons sold along with the price per gallon, the total amount of the sale, the date of the transaction and information from the credit card particularly the name and address of the purchaser together with his identification number. This latter information is usually obtainable by a printing device from raised lettering on the card.

In spite of this time-saving feature of printing the card information, mistakes are frequently made. It is the object of this invention to avoid such mistakes by eliminating the personal factor entirely and recording the sales information automatically. It is also an object of the invention to make a permanent record of this information for periodic auditing.

Referring now to the drawing, FIGURE 1 shows the front view of a gasoline pump with delivery hose and visible meter gauge. The billing device credit card holder plate is indicated at 1 and the printing handle at 11. Window 9 permits manual recording of total gallonage delivered to the pump supply tank. Manual date re-set is shown at 16A.

FIGURE 2 is a side view of FIGURE 1. FIGURE 3 shows the printing wheels 5 and 16. Wheels 5 are synchronized with the meter of the pump and carry numerals which indicate the number of gallons delivered. The price per gallon is set manually as described hereinafter. Printing wheels 16 carry the date of delivery.

A continuous tape 6 is automatically fed through the space beneath the printing wheels on which is printed the same information from each sale. This strip is wound on spools 7 and 8 and makes a permanent record of the sale from the pump. A linkage, not shown, advances tape 6 after each printing operation. The credit card 2 and billing forms, 3, are shown resting on credit card holder plate 1. Station identification data 2a is provided as shown in FIGURE 5. After the delivery is completed, the movement of lever 11 actuates the credit card holder plate 1, forcing it upward against the printing wheels 5 and 16. The upward movement and end of printing motion is stopped by back up plate 4.

Referring now to FIGURE 4 which is a horizontal sectional view of the printing wheels, wheels a, b, c show the number of gallons delivered. Wheels d, e and f show the price per gallon. Wheels g, h, i and j show the total cost of the delivery. Gears 14 are integrated with the printing wheels and are driven, in turn, by gears connected to the meter of the pump, not shown. The price per gallon is pre-set by the pump operator by adjusting wheels d, e and f. The date wheels k, l, m, n, o and p, are also pre-set by the operator.

The tape 6 driven by spools on shafts 17, 17' is used to make a permanent record of the pump sale. It carries a carbon surface on the lower side for printing the sales slip. The tape 6 is caused to progress one space for each movement of the handle 11. Access to the tape through window 9 may be had by the operator for recording daily or weekly deliveries of gasoline to the supply tank from which the pump receives fuel. This feature is shown in FIGURE 3.

FIGURE 6, a sectional view through FIGURE 4, shows the mechanism for raising the billing form and credit card holder plate 1 upward against the printing wheels after completion of the delivery. This operation is performed by the attendant and is done when the delivery is completed. Carriage 10 is moved horizontally and vertically on incline plane when the lever 11 is depressed thus forcing credit card holder plate 1 and billing forms resting thereon upward against the printing wheels 5 and 16. Upward movement is stopped by backup plate 4.

When lever 11 is released upward by the operator, the carriage 10 moves horizontally downward releasing the credit card holder 1 which is then withdrawn by the operator carrying with it the printed sales slip and the customer's credit card. This zeros the pump dials and frees the pump for new delivery.

In operating the improved gasoline pump with the recording device the following steps will be taken. First the delivery will be made through the hose in the usual manner and the hose returned to the pump. The operator then determines whether the sale is cash or credit. If it is a credit sale the credit card is placed together with the blank sales slip in triplicate upon the credit card holder plate 1 and the plate 1 inserted into the pump housing as shown in FIGURE 6. A downward movement of the printing handle 11 then records all the information on the sales slip. On the return stroke of handle 11, the pump motor dials are returned to zero and the pump is free for new delivery. This can be a mechanical or an electrical coupling.

If it is a cash sale, the operation of the printing handle 11 accomplishes the recording of the sale on the record tape 6. In the case of a credit sale the customer will sign the sales slip and will be given one of the slips for his records. Permanent tape 6 remains in the pump and is available to the auditor when desired.

Advantages for the automatic recording device are as follows:

(1) Saving of time for the customer and the station operator increases the amount of time for repeat sales.

(2) A concise, permanent record is obtained which is of special value to the service station manager.

(3) Fewer errors will result because of clear, legible, printed sales records instead of hand-written records.

(4) Gasoline shortages are eliminated because all fuel pumped is accounted for automatically.

(5) A record of total number of gallons delivered to the storage tanks is made on the tape by the operator. By comparing the totalized outage shown on the tape from time to time with these periodic deliveries he can tell at a glance when the supply in the storage tanks requires replacing.

(6) Cash or credit card sales are permanently recorded.

We claim:

1. An apparatus for recording and billing sales of fluids from a metered dispensing pump comprising the following associated parts:
    (1) a billing form holder plate slidable thru a slot in the pump housing;
    (2) printing rollers supported on a shaft and positioned adjacent said billing form holder plate said printing rollers being actuated by gears driven by and synchronized with the meter of said pump;
    (3) type faces on the periphery of said rollers to indicate volume of fuel delivered and the cost thereof;
    (4) means for moving said billing form holder plate into printing contact with said printing rollers, and
    (5) trip means for resetting said printing rollers to the zero position at completion of the printing operation.

2. The apparatus of claim 1 wherein said trip means is actuated automatically by the movement of said billing form holder plate away from said printing rollers.

3. The apparatus of claim 1 wherein means are provided for locking said billing form holder plate in the non-printing position during delivery of fluid, said locking means being released by movement of the hose nozzle retainer at completion of delivery.

4. The apparatus of claim 1 wherein a recording medium is positioned adjacent said printing rollers for recording each sale, said recording medium running from a supply roll at one side of said printing rollers to a receiving roll on the other side thereof, and means for advancing said recording medium after each printing operation.

5. The apparatus of claim 4 wherein said recording medium passes over a table positioned directly behind a window in the housing of said pump making it accessible to the operator for manually recording information thereon.

6. The apparatus of claim 1 wherein means are provided for locking the printing rollers after delivery until printing operation is completed.

References Cited

UNITED STATES PATENTS

| 2,554,296 | 5/1951 | Crews | 346—43 |
| 2,612,428 | 9/1952 | Vroom | 346—43 |
| 2,977,024 | 3/1961 | Harris | 346—43 |

STEPHEN J. TOMSKY, *Primary Examiner.*

EDITH C. SIMMONS, *Assistant Examiner.*

U.S. Cl. X.R.

235—94